(12) United States Patent
Wajima et al.

(10) Patent No.: US 11,867,239 B2
(45) Date of Patent: Jan. 9, 2024

(54) DAMPER DEVICE AND DESIGN METHOD OF DAMPER DEVICE

(71) Applicant: AISIN CORPORATION, Kariya (JP)

(72) Inventors: Masaki Wajima, Aichi (JP); Akihiro Nagae, Aichi (JP); Yuichiro Hirai, Aichi (JP)

(73) Assignee: AISIN CORPORATION, Kariya (JP)

( * ) Notice: Subject to any disclaimer, the term of this patent is extended or adjusted under 35 U.S.C. 154(b) by 404 days.

(21) Appl. No.: 17/266,658

(22) PCT Filed: Sep. 12, 2019

(86) PCT No.: PCT/JP2019/035931
§ 371 (c)(1),
(2) Date: Feb. 8, 2021

(87) PCT Pub. No.: WO2020/059632
PCT Pub. Date: Mar. 26, 2020

(65) Prior Publication Data
US 2021/0364047 A1   Nov. 25, 2021

(30) Foreign Application Priority Data

Sep. 20, 2018 (JP) .................. 2018-176504

(51) Int. Cl.
*F16F 15/134* (2006.01)
*F16D 3/12* (2006.01)
(Continued)

(52) U.S. Cl.
CPC .................. *F16D 3/12* (2013.01); *F02N 7/00* (2013.01); *F16F 15/13469* (2013.01);
(Continued)

(58) Field of Classification Search
CPC ........ F16D 3/12; F02N 7/00; F16F 15/13469; F16F 2226/00; F16F 2228/001;
(Continued)

(56) References Cited

U.S. PATENT DOCUMENTS 5,617,940 A * 4/1997 Fukushima ....... F16F 15/13438
7,172,509 B2 * 2/2007 Yamamoto ........ F16F 15/12366
464/68.8

FOREIGN PATENT DOCUMENTS

JP        04-151056 A    5/1992

OTHER PUBLICATIONS

International Search Report of PCT/JP2019/035931 dated Nov. 19, 2019 [PCT/ISA/210].

* cited by examiner

*Primary Examiner* — Greg Binda
(74) *Attorney, Agent, or Firm* — Sughrue Mion, PLLC

(57) ABSTRACT

A damper device includes: an input element coupled to an engine via a clutch; an intermediate element; an output element coupled to an input shaft of a transmission; a first elastic body that is disposed between the input element and the intermediate element; and a second elastic body that is disposed between the intermediate element and the output element and that acts in series with the first elastic body. When a total moment of inertia of the output element and a rotation element that rotates integrally with the output element on the engine side with respect to the input shaft is $J_2$, and a total moment of inertia of all rotation members included between the input shaft and a differential gear coupled to an output shaft of the transmission is $J_{TM}$, $0.12 \leq J_2/(J_2+J_{TM}) \leq 0.5$ is satisfied.

19 Claims, 7 Drawing Sheets

(51) Int. Cl.
*F02N 7/00* (2006.01)
*F16H 45/02* (2006.01)

(52) U.S. Cl.
CPC .......... *F16H 45/02* (2013.01); *F16F 2226/00* (2013.01); *F16F 2228/001* (2013.01); *F16F 2228/007* (2013.01); *F16F 2232/02* (2013.01); *F16F 2236/08* (2013.01); *F16H 2045/0226* (2013.01)

(58) Field of Classification Search
CPC ............. F16F 2228/007; F16F 2232/02; F16F 2236/08; F16H 45/02; F16H 2045/0226
USPC .............................. 464/68.8; 192/3.28, 213.2
See application file for complete search history.

DAMPER DEVICE AND DESIGN METHOD OF DAMPER DEVICE

CROSS REFERENCE TO RELATED APPLICATIONS

This application is a National Stage of International Application No. PCT/JP2019/035931 filed on Sep. 12, 2019, which claims the benefit of priority from Japanese Patent Application No. 2018-176504 filed on Sep. 20, 2018, the entire contents of which are incorporated herein by reference.

TECHNICAL FIELD

The present disclosure is related to a damper device and a design method of the damper device, in which the damper device includes an input element to which torque from an engine is transmitted, an output element coupled to an input shaft of a transmission, and an elastic body that transmits torque between the input element and the output element.

BACKGROUND ART

Conventionally, a fluid transmission device (for example, see Patent Document 1) is known that includes a front cover coupled to an input rotating shaft (engine), a pump impeller forming a fluid transmission chamber together with the front cover, a turbine runner having a protruding portion formed on the front cover side, a turbine hub (support member) coupled to the turbine runner and an output rotating shaft, a direct clutch that can couple the front cover and the turbine hub, and a damper device that attenuates vibration between a piston plate of the direct clutch and the turbine hub. The turbine hub of the fluid transmission device includes a recessed portion in which a diameter is increased to fill a space between the turbine runner and the damper device and which is formed on the turbine runner side. The recessed portion of the turbine hub and the protruding portion of the turbine runner are coupled to each other by brazing and the turbine hub functions as an inertia mass body. Conventionally, a damper device (for example, see Patent Document 2) is known that includes a drive member to which power from an engine serving as a motor is transmitted, a first intermediate member to which power from the drive member is transmitted via a first spring, a second intermediate member to which power from the first intermediate member is transmitted via a second spring, and a driven member to which power from the second intermediate member is transmitted via a third spring.

RELATED ART DOCUMENTS

Patent Documents

Patent Document 1: Japanese Unexamined Patent Application Publication No. 04-151056 (JP 04-151056 A)
Patent Document 2: Japanese Unexamined Patent Application Publication No. 2012-184840 (JP 2012-184840 A)

SUMMARY OF THE DISCLOSURE

Problem to be Solved by the Invention

In the fluid transmission device described in Patent Document 1, since a moment of inertia of the turbine hub coupled to the output element of the damper device can be further increased, it is possible to shift a plurality of resonances (natural frequency) generated between the engine and the drive shaft to a low frequency side (low rotation side) as a whole. Therefore, in the fluid transmission device described above, it can be considered that it will become easier to shift the resonance on the lower frequency side that affects the setting of the engagement rotation speed (lockup rotation speed) of the direct coupling clutch (for example, the resonance of the mode in which all rotation members between the elastic body on the output side of the damper device and the drive shaft vibrate integrally) to the lower frequency side and set the engagement rotation speed to the lower rotation side. However, depending on the magnitude of the moment of inertia of the turbine hub, there is a possibility that the resonance generated on the higher frequency side (higher rotation side) of the resonance on the low frequency side described above (for example, the resonance of the mode in which the output element and the member that rotates integrally with the output element and all rotation members between the input shaft of the transmission and the drive shaft vibrate in reverse directions) is also generated on the low rotation side and thus, there is a possibility that the vibration damping performance of the damper device in the low rotation region is decreased. In the damper device according to Patent Document 2, it is possible to further decrease a rigidity (equivalent rigidity) of the entire damper device, that is, a combined spring constant of the first, second, and third springs to further improve the vibration damping performance. However, in the damper device described in Patent Document 2, the structure becomes complicated and the number of parts increases, which makes it difficult to suppress an increase in cost.

Thus, an aspect of the present disclosure is to suppress an increase in cost and suppress a vibration damping performance of a damper device in a low rotation region from being deteriorated while decreasing an engagement rotation speed of a clutch that couples the engine and the damper device.

Means for Solving the Problem

A damper device of the present disclosure includes: an input element coupled to an engine via a clutch; an intermediate element; an output element coupled to an input shaft of a transmission; a first elastic body that is disposed between the input element and the intermediate element; and a second elastic body that is disposed between the intermediate element and the output element and that acts in series with the first elastic body. When a total moment of inertia of the output element and a rotation element that rotates integrally with the output element on the engine side with respect to the input shaft is $J_2$, and a total moment of inertia of all rotation members included between the input shaft and a differential gear coupled to an output shaft of the transmission is $J_{TM}$, $0.12 \leq J_2/(J_2+J_{TM}) \leq 0.5$ is satisfied.

The present inventors conducted intensive research in order to further improve the vibration damping performance of the damper device including the input element, the intermediate element, the output element, and the first and second elastic bodies. As a result, the inventors focused on the relationship between the total moment of inertia $J_2$ of the output element of the damper device and the rotation element that rotates integrally with the output element on the engine side with respect to the input shaft of the transmission, and the total moment of inertia $J_{TM}$ of all the rotation members included between the input shaft of the transmission and the differential gear. The present inventors found that by configuring the damper device so that the ratio $J_2/(J_2+J_{TM})$ of the moment of inertia $J_2$ with respect to the sum $(J_2+J_{TM})$ of the moment of inertia $J_2$ and the moment of inertia $J_{TM}$ satisfies $0.12 \le J_2/(J_2+J_{TM}) \le 0.5$, it is possible to shift the resonance on the lower frequency side of the engagement rotation speed to the much lower frequency side, while suppressing a decrease in the vibration damping performance of the damper device due to the resonance on the higher frequency side of the engagement rotation speed of the clutch. In this way, in the damper device of the present disclosure, it is possible to decrease the engagement rotation speed of the clutch that couples the engine and the damper device, while suppressing an increase in cost due to an addition of a second intermediate element and an elastic body, and while suppressing a decrease in the vibration damping performance in the low rotation region.

Another damper device of the present disclosure is a damper device including: an input element coupled to an engine via a clutch; an output element coupled to an input shaft of a transmission; and a plurality of elastic bodies disposed between the input element and the output element, in which when a total moment of inertia of the output element and a rotation element that rotates integrally with the output element on the engine side with respect to the input shaft is $J_2$, and a total moment of inertia of all rotation members included between the input shaft and a differential gear coupled to an output shaft of the transmission is $J_{TM}$, $0.12 \le J_2/(J_2+J_{TM}) \le 0.55$ is satisfied.

The present inventors have conducted intensive studies to improve the vibration damping performance of a damper device including an input element, an output element, and a plurality of elastic bodies disposed between the input element and the output element, and as a result have found that by configuring the damper device so that the ratio $J_2/(J_2+J_{TM})$ of the moment of inertia $J_2$ with respect to the sum $(J_2+J_{TM})$ of the moment of inertia $J_2$ and the moment of inertia $J_{TM}$ satisfies $0.12 \le J_2/(J_2+J_{TM}) \le 0.55$, it is possible to shift the resonance on the lower frequency side of the engagement rotation speed to the much lower frequency side, while suppressing a decrease in the vibration damping performance of the damper device due to the resonance on the higher frequency side of the engagement rotation speed of the clutch. In this way, in other damper devices of the present disclosure, it is possible to decrease the engagement rotation speed of the clutch that couples the engine and the damper device, while suppressing an increase in cost due to an addition of an intermediate element and an elastic body, and while suppressing a decrease in the vibration damping performance in the low rotation region.

DESCRIPTION OF EMBODIMENTS

Next, embodiments for carrying out the various aspects of the present disclosure will be described with reference to the drawings.

Figure 1:
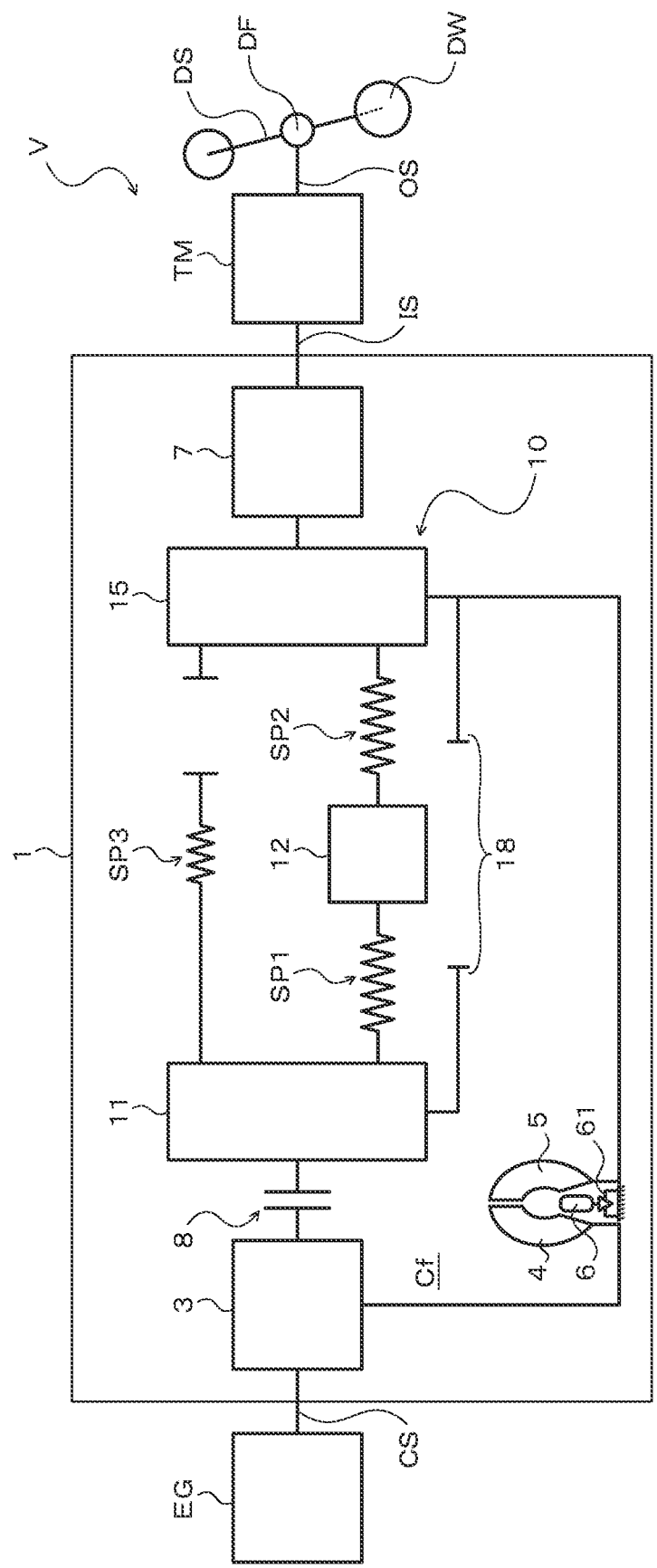
FIG. 1 is a schematic configuration diagram showing a starting device including a damper device of the present disclosure.
Figure 2:
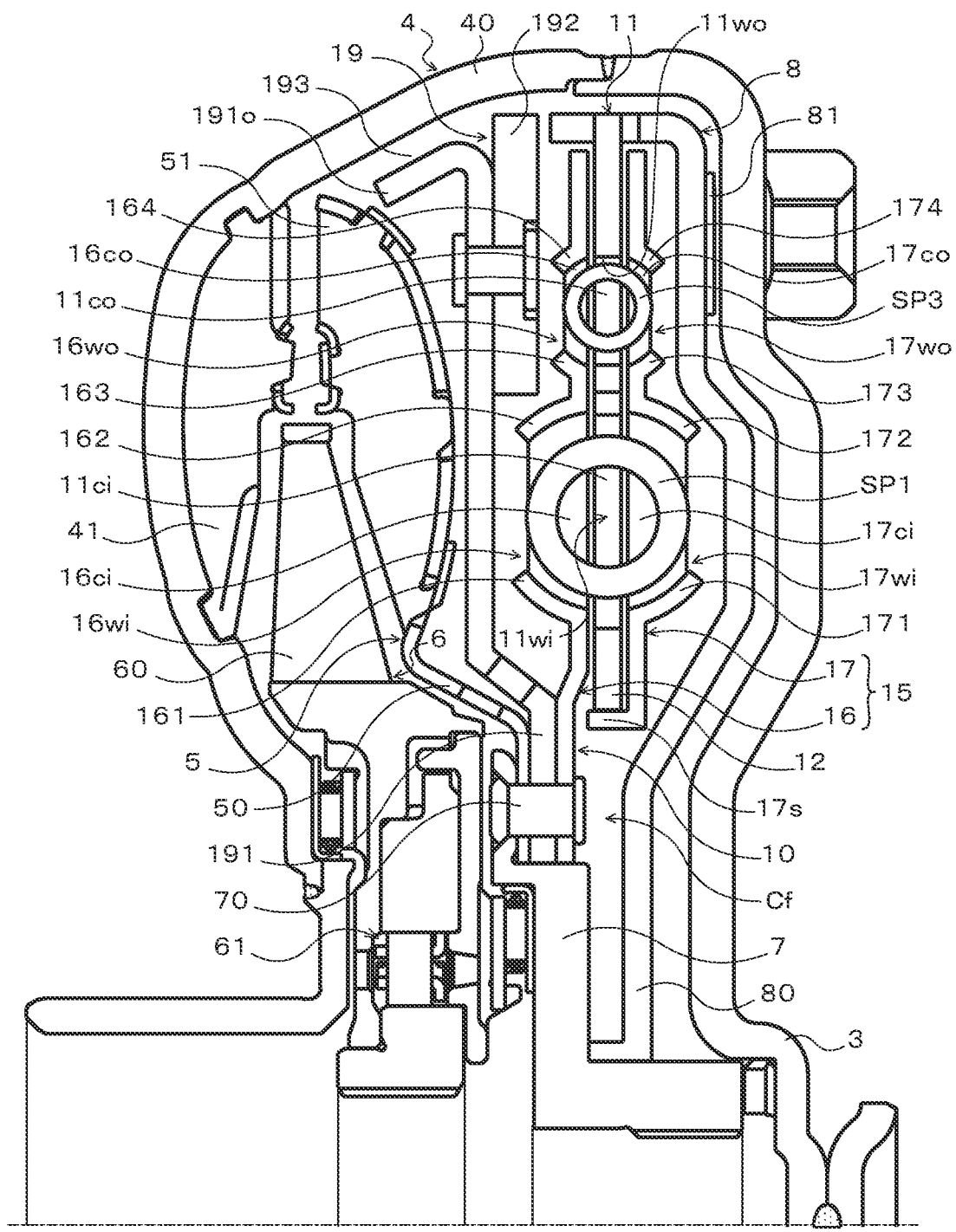
FIG. 2 is a partial cross-sectional view showing the damper device of the present disclosure.

FIG. 1 is a schematic configuration diagram showing a starting device 1 including a damper device 10 of the present disclosure. FIG. 2 is a partial cross-sectional view showing the damper device 10. The starting device 1 shown in these drawings is installed in a vehicle V including an engine EG (internal combustion engine) serving as a driving device, an automatic transmission (AT), a transmission (TM) such as a continuously variable transmission (CVT), a differential gear DF coupled directly to or via a gear mechanism (not shown) an output shaft OS of the transmission TM, a drive shaft DS coupled to the differential gear DF (a pair of side gears), and drive wheels DW coupled to the drive shaft DS, etc.

In addition to the damper device 10, the starting device 1 includes a front cover 3 serving as an input member that is coupled to a crankshaft CS of the engine EG and to which torque from the engine EG is transmitted, a pump impeller (input side fluid transmission element) 4 fixed to the front cover 3, a turbine runner (output side fluid transmission element) 5 disposed in a fluid chamber Cf defined by the front cover 3 and the pump impeller 4 so that the turbine runner 5 rotates coaxially with the pump impeller 4, a stator 6 that is disposed in the fluid chamber Cf and that rectifies the flow of working oil (working fluid) from the turbine runner 5 to the pump impeller 4, a damper hub 7 serving as an output member that is coupled to the damper device 10 and that is fixed to an input shaft IS of the transmission TM, and a lockup clutch 8, etc.

In the following description, unless otherwise specified, an "axial direction" basically indicates an extending direction of a central axis (axial center) of the starting device 1 and the damper device 10. Unless otherwise specified, a "radial direction" is basically indicates the radial direction of the starting device 1, the damper device 10, a rotation element of the damper device 10 and the like, that is, the linear extending direction that extends from the central axis of the starting device 1 and the damper device 10 in a direction (radial direction) orthogonal to the central axis. Further, unless otherwise specified, a "circumferential direction" basically indicates a circumferential direction of the starting device 1, the damper device 10, and the rotation element of the damper device 10, that is, a direction along a rotating direction of the rotation element.

The pump impeller 4 includes a pump shell 40 (not shown) tightly fixed to the front cover 3 and a plurality of pump blades 41 arranged on an inner surface of the pump shell 40. As shown in FIG. 2, the turbine runner 5 includes a turbine shell 50 and a plurality of turbine blades 51 arranged on an inner surface of the turbine shell 50. An inner peripheral portion of the turbine shell 50 is fixed to the damper hub 7 via a plurality of rivets 70. The pump impeller 4 and the turbine runner 5 face each other, and the stator 6 is coaxially disposed therebetween. The stator 6 includes a plurality of stator blades 60, and the rotation direction of the stator 6 is set to only one direction by a one-way clutch 61 (see FIG. 1). The pump impeller 4, the turbine runner 5, and the stator 6 form a torus (annular flow path) for circulating working oil, and function as a torque converter (fluid transmission device) having a torque amplification function. However, in the starting device 1, the stator 6 and the one-way clutch 61 may be omitted, and the pump impeller 4 and the turbine runner 5 may function as a fluid coupling.

The lockup clutch 8 is arranged in the fluid chamber Cf described above, performs lockup for coupling the front cover 3 and the damper hub 7 via the damper device 10, and releases the lockup. As shown in the figure, the lockup clutch 8 may be a hydraulic single plate clutch including a lockup piston 80 to which a friction material 81 is attached, or may be a hydraulic multi-plate clutch including at least one friction engagement plate (a plurality of friction materials).

The damper device 10 is arranged in the fluid chamber Cf described above, and as shown in FIGS. 1 and 2, includes a drive plate (input element) 11, an intermediate member (intermediate element) 12, and a driven member (output element) 15, as rotation elements. Further, the damper device 10 includes, as torque transmission elements (torque transmission elastic bodies), a plurality of (for example, three in the present embodiment) first springs (first elastic bodies) SP1 that transmits torque between the drive plate 11 and the intermediate member 12, a plurality of (for example, three in the present embodiment) second springs (second elastic bodies) SP2 that acts in series on each corresponding first spring SP1 to transmit torque between the intermediate member 12 and a driven member 15, and a plurality of (for example, three in the present embodiment) third springs SP3 that transmits torque between the drive plate 11 and the driven member 15.

In the present embodiment, as the first and second springs SP1, SP2 and the third spring SP3, a linear type coil spring made of a metal material spirally wound so as to have an axial center extending straight when no load is applied is adopted. As a result, the first and second springs SP1, SP2 and the third spring SP3 can be expanded and contracted more appropriately along the axial center, compared to the case in which an arc coil spring is used. As a result, it is possible to decrease the difference between torque transmitted from the second spring SP2 or the like to the driven member 15 when the relative displacement between the drive plate 11 (input element) and the driven member 15 (output element) increases, and torque transmitted from the second spring SP2 or the like to the driven member 15 when the relative displacement between the drive plate 11 and the driven member 15 decreases, that is, the hysteresis. However, an arc coil spring may be adopted as at least one of the first and second springs SP1, SP2 and the third spring SP3. Further, the spring constants of the first and second springs SP1, SP2 may be the same or different from each other. Further, in the present embodiment, a combined spring constant of the plurality of first springs SP1 and the plurality of second springs SP2 is a value within the range of 600 Nm/rad to 1000 Nm/rad.

As shown in FIG. 2, the drive plate (input plate) 11 of the damper device 10 is one annular plate (pressed product) formed by press working a metal plate, and an outer peripheral portion of the drive plate 11 is coupled to the lockup piston 80 of the lockup clutch 8. As a result, the front cover 3 (engine EG) and the drive plate 11 of the damper device 10 are coupled by engaging (meshing) the lockup clutch 8. Further, the drive plate 11 has a plurality of (for example, three in the present embodiment) inner spring housing windows 11wi each extending in an arc shape, and a plurality of (for example, three in the present embodiment) inner spring contact portions 11ci, a plurality of (for example, three in the present embodiment) outer spring housing windows 11wo each extending in an arc shape, and a plurality of (for example, six in the present embodiment) outer spring contact portions 11co.

The plurality of inner spring housing windows 11wi is each opened on the inner peripheral side of the drive plate 11, and is arranged on the drive plate 11 at intervals (equally spaced) in the circumferential direction. The inner spring contact portions 11ci are formed one by one between the inner spring housing windows 11wi that are adjacent in the circumferential direction. Each of the plurality of outer spring housing windows 11wo has a circumferential length corresponding to the natural length of the third spring SP3, and is arranged radially outward of the inner spring housing window 11wi at equal intervals. One outer spring contact portion 11co is formed on both sides of each outer spring housing window 11wo in the circumferential direction.

Figure 7:
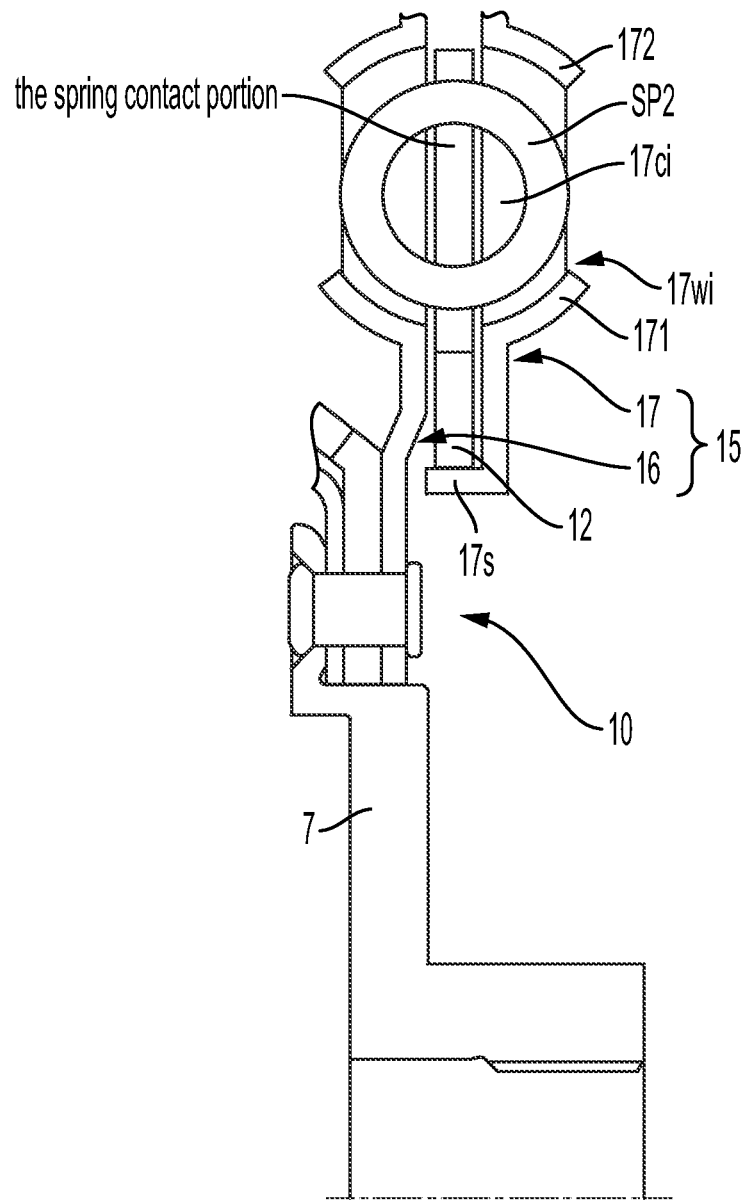
FIG. 7 is a non-limiting illustration of a spring contact portion in a partial view of the damper device.

The intermediate member 12 is one annular plate (pressed product) formed by press working a metal plate, and is rotatably supported by the driven member 15. The intermediate member 12 includes a plurality of (for example, three in the present embodiment) spring contact portions (see FIG. 7) protruding radially outward from the outer peripheral surface at intervals (equally spaced) in the circumferential direction.

The driven member 15 includes an first output plate 16 that is fixed to the damper hub 7 together with the turbine shell 50 of the turbine runner 5 via the plurality of rivets 70, and a second output plate 17 that has a larger inner diameter than the first output plate 16 and that is disposed so as to be spaced away from the turbine runner 5. The first and second output plates 16, 17 are annular plate bodies (pressed products) formed by pressing a metal plate.

Further, as shown in FIG. 2, the first output plate 16 has a plurality of (for example, three in the present embodiment) inner spring housing windows 16wi each extending in an arc shape, and a plurality of (for example, three in the present embodiment) inner spring contact portions 16ci, a plurality of (for example, three in the present embodiment) outer spring housing windows 16wo each extending in an arc shape, and a plurality of (for example, six in the present embodiment) outer spring contact portions (elastic body contact portions) 16co. The inner spring housing windows 16wi are arranged in the first output plate 16 at intervals (equal intervals) in the circumferential direction, and one inner spring contact portion 16ci is formed between each of the adjacent inner spring housing windows 16wi in the circumferential direction. Each outer spring housing window 16wo has a circumferential length longer than the natural length of the third spring SP3, and is arranged radially outward of the inner spring housing window 16wi at intervals (equal intervals) in the circumferential direction. One outer spring contact portion 16co is formed on both sides of each outer spring housing window 16wo in the circumferential direction.

Further, the first output plate 16 includes a plurality of (for example, three in the present embodiment) spring support portions 161 that extends along an inner peripheral edge of each inner spring housing window 16wi, a plurality of (for example, three in the present embodiment) spring support portions 162 that extends along an outer peripheral edge of each inner spring housing window 16wi, a plurality of (for example, three in the present embodiment) spring support portions 163 that extends along an inner peripheral edge of each outer spring housing window 16wo, and a plurality of (for example, three in the present embodiment) spring support portions 164 that extends along an outer peripheral edge of each outer spring housing window 16wo.

Further, as shown in FIG. 2, the second output plate 17 has a plurality of (for example, three in the present embodiment) inner spring housing windows 17wi each extending in an arc shape, and a plurality of (for example, three in the present embodiment) inner spring contact portions 17ci, a plurality of (for example, three in the present embodiment) outer spring housing windows 17wo each extending in an arc shape, and a plurality of (for example, six in the present embodiment) outer spring contact portions (elastic body contact portions) 17co. The inner spring housing windows 17wi are arranged in the second output plate 17 at intervals (equal intervals) in the circumferential direction, and one inner spring contact portion 17ci is formed between each of the adjacent inner spring housing windows 17wi in the circumferential direction. Each outer spring housing window 17wo has a circumferential length longer than the natural length of the third spring SP3, and is arranged radially outward of the inner spring housing window 17wi at intervals (equal intervals) in the circumferential direction. One outer spring contact portion 17co is formed on both sides of each outer spring housing window 17wo in the circumferential direction.

Further, the second output plate 17 includes a plurality of (for example, three in the present embodiment) spring support portions 171 that extends along an inner peripheral edge of each inner spring housing window 17wi, a plurality of (for example, three in the present embodiment) spring support portions 172 that extends along an outer peripheral edge of each inner spring housing window 17wi, a plurality of (for example, three in the present embodiment) spring support portions 173 that extends along an inner peripheral edge of each outer spring housing window 17wo, and a plurality of (for example, three in the present embodiment) spring support portions 174 that extends along an outer peripheral edge of each outer spring housing window 17wo.

As shown in FIG. 2, the first and second output plates 16, 17 face each other along the axial direction of the damper device 10, and are coupled via a plurality of rivets (not shown) so as to sandwich the drive plate 11 and the intermediate member 12. That is, the drive plate 11 is disposed in the outer peripheral side region between the first and second output plates 16, 17 in the axial direction. Further, the intermediate member 12 is disposed in the inner peripheral side region between the first and second output plates 16, 17 in the axial direction so that each spring contact portion is positioned in the corresponding inner spring housing window 11wi of the drive plate 11, that is, the intermediate member 12 is disposed radially inward of the drive plate 11. Further, the inner peripheral surface of the intermediate member 12 is rotatably supported by the support portion 17s extending axially from the inner peripheral portion of the second output plate 17.

The first and second springs SP1, SP2 are arranged in the inner spring housing window 11wi of the drive plate 11 so as to be alternately arranged along the damper device 10 in the circumferential direction and are supported by the first and second output plates 16, 17. That is, the first and second springs SP1, SP2 are disposed one by one in the inner spring housing windows 11wi, 16wi, and 17wi that are arranged in the axial direction of the damper device 10 so that the first and second springs SP1, SP2 are paired (act in series). Further, the first and second springs SP1, SP2 in each inner spring housing window 11wi are supported (guided) from the inner radial side by the corresponding spring support portions 161, 171 of the first and second output plates 16, 17. The first and second springs SP1, SP2 in each inner spring housing window 11wi are supported (guided) from the outer radial side by the corresponding spring support portions 162, 172 of the first and second output plates 16, 17.

Further, in the mounted state of the damper device 10 (the state in which torque is not transmitted between the drive plate 11 and the driven member 15), each inner spring contact portion 11ci of the drive plate 11 is in contact with end portions of the first and second springs SP1, SP2, which are disposed in the inner spring housing windows 11wi different from each other and that are not paired (do not act in series), between the first and second springs SP1, SP2. That is, in the mounted state of the damper device 10, one end portion of each first spring SP1 and the other end portion of each second spring SP2 come into contact with the corresponding inner spring contact portion 11ci of the drive plate 11. Further, in the mounted state of the damper device 10, each spring contact portion of the intermediate member 12 is in contact with the end portions of the first and second springs SP1, SP2, which are disposed in the common inner spring housing windows 11wi, 16wi and 17wi and which are paired with each other, between the first and second springs SP1, SP2. That is, the other end portion of each first spring SP1 and the one end portion of each second spring SP2 are in contact with the corresponding spring contact portion of the intermediate member 12.

Similar to the inner spring contact portion 11ci of the drive plate 11, the inner spring contact portions 16ci, 17ci of the first and second output plates 16, 17 (driven members 15) facing each other are also in contact with the end portions of the first and second springs SP1, SP2, which are not paired (do not act in series), between the first and second springs SP1, SP2. Thus, in the mounted state of the damper device 10, the one end portion of each first spring SP1 is also in contact with the corresponding inner spring contact portions 16ci, 17ci of the driven member 15, and the other end portion of each second spring SP2 is also in contact with the corresponding inner spring contact portions 16ci, 17ci of the driven member 15. As a result, the driven member 15 is coupled to the drive plate 11 via the plurality of first springs SP1, the intermediate member 12, and the plurality of second springs SP2, and the first and second springs SP1, SP2 that are paired with each other are coupled in series via the intermediate member 12 (spring contact portion), between the drive plate 11 and the driven member 15. In the present embodiment, the first and second springs SP1, SP2, which are each plural, are arranged on the same circumference, and the distance between the axial center of the starting device 1 and the damper device 10 and the axial center of each first spring SP1 and the distance between the axial center of the starting device 1, etc. and the axial center of each second spring SP2 are the same.

Each third spring SP3 is disposed (fitted) in the corresponding outer spring housing window 11wo of the drive plate 11 and is supported by the first and second output plates 16, 17. That is, in the mounted state of the damper device 10, both end portions of each third spring SP3 are in contact with the corresponding outer spring contact portion 11co of the drive plate 11, and each third spring SP3 is positioned near the center portion of the corresponding outer spring housing windows 16wo, 17wo of the first and second output plates 16, 17 in the circumferential direction. Further, the third spring SP3 in each outer spring housing window 11wo is supported (guided) from the inner radial side by the corresponding spring support portions 163, 173 of the first and second output plates 16, 17. The third spring SP3 in each outer spring housing window 11wo is supported (guided) from the outer radial side by the corresponding spring support portions 164, 174 of the first and second output plates 16, 17. In the present embodiment, each of the third springs SP3 is arranged so as to overlap with the first and second springs SP1, SP2 when viewed from the radial direction, on the outer radial side of the first and second springs SP1, SP2. As a result, the axial length of the damper device 10 and also the shaft length of the starting device 1 can be further shortened.

In the mounted state of the damper device 10, a predetermined interval in the circumferential direction is formed between each third spring SP3 and the outer spring contact portions 16co, 17co of the first and second output plates 16, 17 (driven member 15) positioned on both sides of the third spring SP3, and each third spring SP3 and the outer spring contact portions 16co, 17co are not in contact with each other. One of the outer spring contact portions 16co, 17co positioned on both sides of each third spring SP3 is in contact with one end portion of the third spring SP3 as the relative torsion angle of the drive plate 11 and the driven member 15 increases when torque is transmitted between the drive plate 11 and the driven member 15. In the present embodiment, the circumferential distance between the end portion of the third spring SP3 and the outer spring contact portions 16co, 17co of the driven member 15 in the mounted state of the damper device 10 is set so that one end portion of the third spring SP3 positioned on a front side of the drive plate 11 and the like in a main rotation direction (rotation direction (of the engine EG) when a vehicle is moving forward) is in contact with the outer spring contact portions 16co, 17co on the front side in the main rotation direction, when an input torque transmitted from the engine EG to the drive plate 11 reaches a predetermined torque (first value) T1 that is smaller than a torque T2 (second value) corresponding to the maximum torsion angle θ max of the damper device 10.

Further, the damper device 10 includes a stopper 18 (see FIG. 1) that regulates the relative rotation of the drive plate 11 and the driven member 15. In the present embodiment, the stopper 18 is configured to regulate the relative rotation of the drive plate 11 and the driven member 15 when the input torque to the drive plate 11 reaches the torque T2 corresponding to the maximum torsion angle θ max. As a result, in the damper device 10, the first and second springs SP1, SP2 act in series until the input torque to the drive plate 11 reaches the torque T1. Further, while the input torque to the drive plate 11 is included in the range from the torque T1 to the torque T2, the third spring SP3 acts in parallel with the first and second springs SP1, SP2 acting in series. Thus, the damper device 10 has a two-step (two-stage) damping characteristic.

Further, the damper device 10 includes a mass body 19 fixed to the damper hub 7 so as to be located between the turbine runner 5 and the first output plate 16 of the damper device 10 in the axial direction. The mass body 19 includes an annular first plate 191 having a diameter larger than that of the turbine runner 5 and an annular second plate 192 having an inner diameter larger than an inner diameter of the first plate 191. An inner peripheral portion of the first plate 191 is fixed to the damper hub 7 together with the turbine shell 50 of the turbine runner 5 and the first output plate 16 via the plurality of rivets 70. Further, an outer peripheral portion 1910 of the first plate 191 is bent toward the turbine runner 5, and at least one balance weight 193 is fixed to the outer peripheral portion 1910 as needed. The second plate 192 is fixed to the first plate 191 via a plurality of rivets so as not to interfere with the first output plate 16 (spring support portion 162) and the like.

In the starting device 1 configured as described above, when the lockup by the lockup clutch 8 is released, the torque (power) transmitted from the engine EG to the front cover 3 is transmitted to the input shaft IS of the transmission TM via the path of the pump impeller 4, the turbine runner 5, the driven member 15, and the damper hub 7, and is further transmitted to the drive wheels DW via the differential gear DF and the drive shaft DS, as can be seen from FIG. 1. In contrast, when the lockup is executed by the lockup clutch 8 of the starting device 1, the torque transmitted from the engine EG to the drive plate 11 via the front cover 3 and the lockup clutch 8 is transmitted to the driven member 15 and the damper hub 7 via the plurality of first springs SP1, the intermediate member 12, and the plurality of second springs SP2 until the input torque to the drive plate 11 reaches the torque T1 described above. During this time, the fluctuations in the torque from the engine EG are damped (absorbed) by the first and second springs SP1, SP2 that act in series.

Further, when the input torque to the drive plate 11 becomes the torque T1, the end portion on the front side of the third spring SP3 in the main rotation direction is in contact with the outer spring contact portions 16co, 17co on the front side in the main rotation direction, as described above. Thus, each third spring SP3 acts in parallel with the first and second springs SP1, SP2 acting in series and transmits the torque between the drive plate 11 and the intermediate member 12, while expanding and contracting between the outer spring contact portion 11co on the rear side of the drive plate 11 in the main rotation direction described above and the outer spring contact portions 16co, 17co on the front side of driven member 15 (first and second output plates 16, 17) in the main rotation direction described above.

As a result, while the input torque to the drive plate 11 is included in the range from torque T1 to torque T2, the torque from the engine EG is transmitted to the input shaft IS of the transmission device via the path of the front cover 3, the lockup clutch 8, the drive plate 11, the first and second springs SP1, SP2 acting in series via the intermediate member 12, the third spring SP3 acting in parallel with the first and second springs SP1, SP2, the driven member 15, and the damper hub 7. While the input torque to the drive plate 11 is included in the range from torque T1 to torque T2, the fluctuation of the torque input to the front cover 3 is damped (absorbed) by the first to third springs SP1, SP2, and SP3. Thus, with the first to third springs SP1, SP2, and SP3, it becomes possible to absorb a large torque fluctuation transmitted to the drive plate 11.

Here, in the damper device 10, when the lockup is executed by the lockup clutch 8, the driven member 15 (first and second output plates 16, 17) that is an output element rotates integrally with the turbine runner 5, the damper hub 7, and the mass body 19. Thus, in the damper device 10, it is possible to further increase the total moment of inertia $J_2$ of the driven member 15, the turbine runner 5, the damper hub 7, the mass body 19, and the plurality of rivets 70 that couples the above elements, and it is possible to shift the entirety of the plurality of resonances (natural frequency=√ (corresponding rigidity (spring constant)/corresponding moment of inertia)) generated between the engine EG and the drive shaft DS to the low frequency side (low rotation side). As a result, in the damper device 10, it is possible to further decrease a lockup rotation speed Nlup (engagement rotation speed) by first setting, after the engine EG is started, the lockup rotation speed Nlup of the lockup clutch 8 that couples the engine EG and the damper device 10 to the rotation speed range in which any resonance that occurs in the low rotation region in which lockup is not executed converges. However, depending on the magnitude of the moment of inertia $J_2$, there is a possibility that the resonance of the next mode is generated between the engine EG and the drive shaft DS immediately after the lockup clutch 8 is engaged, the torque fluctuation in the driven member 15 becomes large, and the vibration damping performance of the damper device 10 in the low rotation region near the lockup rotation speed Nlup is decreased.

With this in mind, the present inventors conducted intensive research in order to further improve the vibration damping performance of the damper device 10 and as a result, the inventors focused on the relationship between the moment of inertia $J_2$ described above and the total moment of inertia $J_{TM}$ of all the rotation members included between the input shaft IS of the transmission TM and the differential gear DF (the pair of side gears coupled to the drive shaft DS). The moment of inertia $J_{TM}$ is the total moment of inertia of all rotation members of the transmission TM such as various shafts, which are the input shaft IS and the output shaft OS for example, and gears and all rotation members of the differential gear DF. When a gear mechanism, etc. is included between the output shaft OS and the differential gear DF, the moment of inertial of all rotation members of the gear mechanism is included in the moment of inertia $J_{TM}$. Then, the present inventors determined the appropriate range of the ratio $J_2/(J_2+J_{TM})$ of the moment of inertia $J_2$ with respect to the sum $(J_2+J_{TM})$ of the moment of inertia $J_2$ and the moment of inertia $J_{TM}$.

Figure 3:
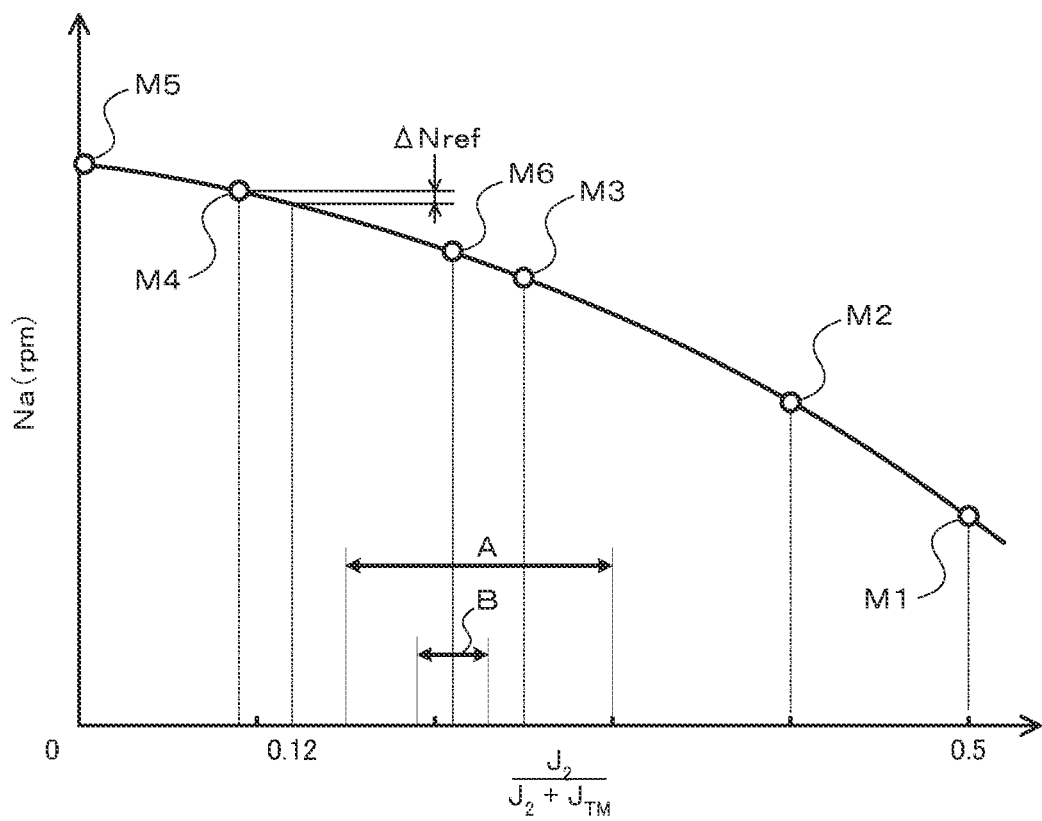
FIG. 3 is a chart showing the relationship between a ratio J2/(J2+JTM) of a moment of inertia J2 to the sum of the moment of inertia J2 and a moment of inertia JTM, and an allowable lockup rotation speed.
Figure 4:
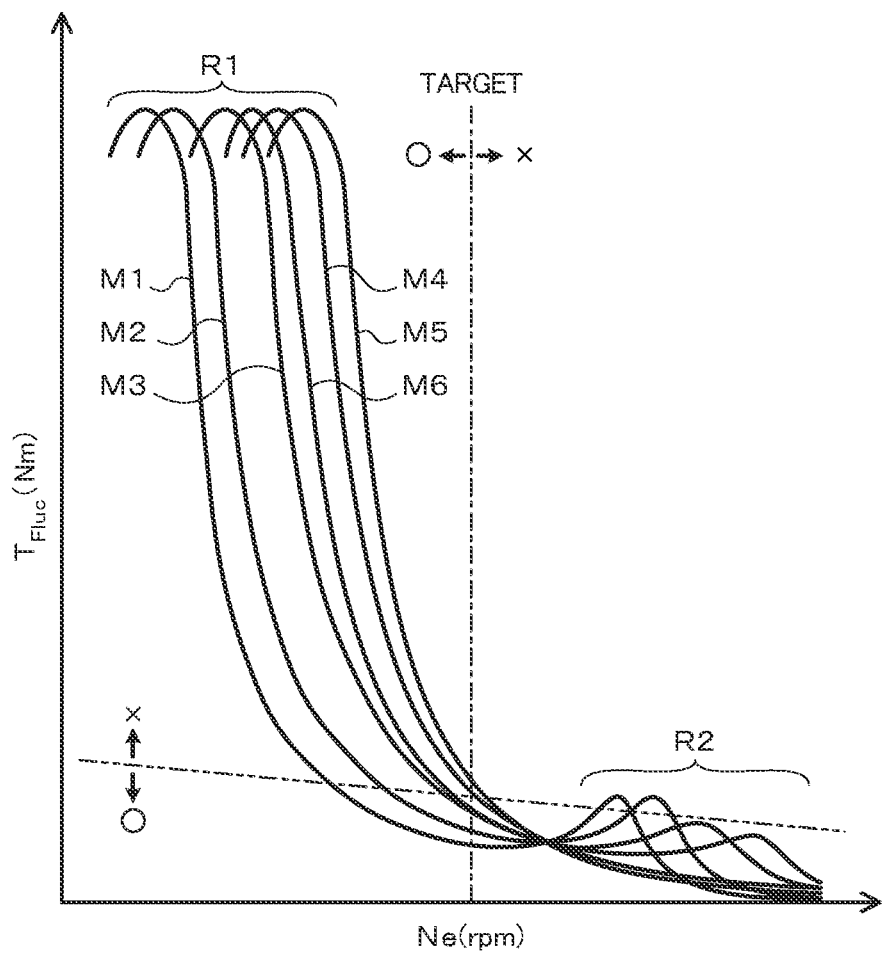
FIG. 4 is a chart showing an example of the relationship between a rotation speed of the engine and a torque fluctuation of an output element of the damper device.

Specifically, the present inventors prepared models of a plurality of damper devices in which the ratios $J_2/(J_2+J_{TM})$ are different from each other, obtained the allowable lockup rotation speed Na for which engagement of the lockup clutch 8 is allowed for each model by analysis, and obtained the characteristic curve in FIG. 3 indicating the relationship between the ratio $J_2/(J_2+J_{TM})$ and the allowable lockup rotation speed Na. In FIG. 3, a model M1 is a model of the damper device in which the ratio $J_2/(J_2+J_{TM})$ equals 0.5, a model M2 is a model of the damper device in which the ratio $J_2/(J_2+J_{TM})$ equals 0.4, a model M3 is a model of the damper device in which the ratio $J_2/(J_2+J_{TM})$ equals 0.25, a model M4 is a model of the damper device (existing product) in which the ratio $J_2/(J_2+J_{TM})$ equals 0.09, a model M5 is a model of the damper device in which the ratio $J_2/(J_2+J_{TM})$ equals 0.03, and a model M6 is a model of the damper device in which the ratio $J_2/(J_2+J_{TM})$ equals 0.21. The structure of the models M1 to M5 is the same as the damper device 10 described above. Further, the present inventors obtained a torque fluctuation $T_{Fluc}$ (vibration level) of the driven member 15 in each of the models M1 to M5 by analysis. FIG. 4 shows the relationship between the rotation speed Ne of the engine EG and the torque fluctuation $T_{Fluc}$ of the driven member 15 in the models M1 to M5. In FIG. 4, the long dashed short dashed line indicates the target lockup rotation speed Nlup (the left side (○ side) of the long dashed short dashed line in the figure corresponds to the allowable range) and the long dashed double short dashed line indicates the allowable level of the resonance (the lower side (○ side) of the long dashed double short dashed line in the figure corresponds to the allowable range).

As shown in FIG. 3, as the ratio $J_2/(J_2+J_{TM})$ increases, the allowable lockup rotation speed Na decreases. However, as can be seen from FIG. 4, as the ratio $J_2/(J_2+J_{TM})$ increases, the resonance (for example, a resonance of a mode in which all the rotation members between the second spring SP2 and the input shaft IS and all the rotation member between the input shaft IS and the drive shaft DS vibrate in reverse direction, see a resonance R2 in FIG. 4) after the resonance (see a resonance R1 in FIG. 4) that is to be generated in the low rotation region in which lockup is not executed is generated on the low rotation side (for example, near 2000 rpm) and thus, there is a possibility that the vibration damping performance of the damper device 10 in the low rotation region near the lockup rotation speed Nlup is decreased. Further, in order to increase the ratio $J_2/(J_2+J_{TM})$, it is necessary to increase the value of the moment of inertia $J_2$, and the increase in the moment of inertia $J_2$ causes an increase in weight and size of the mass body 19 and also the damper device 10. Thus, the present inventors set the upper limit of the ratio $J_2/(J_2+J_{TM})$ to 0.5 in consideration of the timing at which the resonance is generated and the increase in the weight of the damper device 10, and the like. Further, in order to make the decrease amount of the lockup rotation speed Nlup with respect to the model M4 corresponding to an existing product equal to or more than a predetermined minimum decrease amount ΔNref (for example, 20 rpm), the lower limit of the ratio $J_2/(J_2+J_{TM})$ based on the characteristic curve and the minimum decrease amount ΔNref in FIG. 3 is set to 0.12.

From such studies, the damper device 10 of the present disclosure is designed so that the ratio $J_2/(J_2+J_{TM})$ of the moment of inertia $J_2$ with respect to the sum $(J_2+J_{TM})$ of the moment of inertia $J_2$ and the moment of inertia $J_{TM}$ satisfies $0.12 \leq J_2/(J_2+J_{TM}) \leq 0.5$. That is, when the damper device 10 is designed, the value of the moment of inertia $J_2$ is set so that the ratio $J_2/(J_2+J_{TM})$ satisfies $0.12 \leq J_2/(J_2+J_{TM}) \leq 0.5$. As a result, it is possible to shift the resonance on the lower frequency side of the lockup rotation speed Nlup (see the resonance R1 in FIG. 3) to the much lower rotation side while suppressing a decrease in the vibration damping performance of the damper device 10 due to the resonance (see the resonance R2 in FIG. 3) on the high rotation side of the lockup rotation speed Nlup. As a result, in the damper device 10, it is possible to decrease the lockup rotation speed Nlup while suppressing the vibration damping performance in the low rotation region near the lockup rotation speed Nlup from decreasing, and while suppressing the increase in cost due to an addition of a second intermediate member and a spring. Further, as a result of the studies of the present inventors, when the moment of inertia $J_2$, $J_{TM}$ satisfy $0.15 \leq J_2/(J_2+J_{TM}) \leq 0.3$ (range A in FIG. 3), or more preferably, $0.19 \leq J_2/(J_2+J_{TM}) \leq 0.23$ (range B in FIG. 3), it is apparent that it is possible to achieve a good balance of suppressing the vibration damping performance in the low rotation region from decreasing and ensuring the decrease amount of the lockup rotation speed Nlup.

Further, the damper device 10 described above includes one drive plate 11 as an input element, and includes as the output element, the first and second output plates 16, 17 that face each other along the axial direction and that are coupled to each other so as to sandwich the drive plate 11. As a result, the moment of inertia of the driven member 15 and also the moment of inertia $J_2$ described above can be made larger. Further, the thickness of at least one of the first and second output plates 16, 17 may be equal to or larger than the thickness of the drive plate 11. In this case, the thickness of a straight portion extending in the radial direction of at least one of the first and second output plates 16, 17 may be equal to or larger than the thickness of a straight portion of the drive plate 11, and the thickness of a base material of at least one of the first and second output plates 16, 17 may be equal to or larger than the thickness of a base material of the drive plate 11. Among the first and second output plates 16, 17, one that is coupled to the damper hub 7, that is, the thickness of the first output plate 16 may be equal to or larger than the thickness of the drive plate 11.

Figure 5:
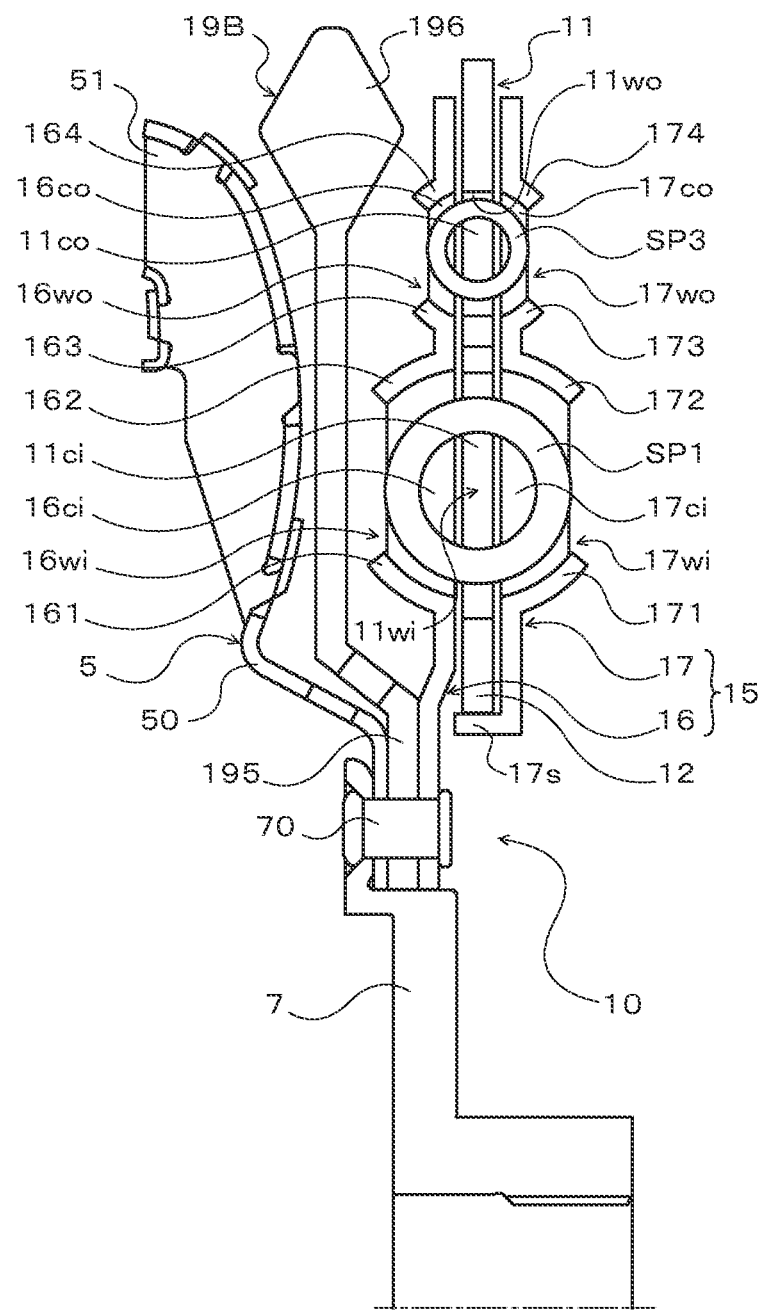
FIG. 5 is a partial cross-sectional view showing the damper device including another mass body in the present disclosure.

Further, a mass body 19B as shown in FIG. 5 may be coupled to the driven member 15 of the damper device 10. The mass body 19B shown in FIG. 5 includes only one annular plate member 195. A base material of the plate member 195 has an outer diameter sufficiently larger than the outer diameter of the turbine runner 5, and a widened portion 196 is formed in an outer peripheral portion of the plate member 195 by flow forming work being performed on the outer peripheral portion of the base material. Thus, it is possible to obtain the mass body 19B having the same moment of inertia as the mass body 19 described above while reducing the number of parts and eliminating the riveting process and the like. Therefore, it is possible to reduce the cost of the damper device 10 by coupling the driven member 15 and the mass body 19B.

In the damper device 10 described above, both the turbine runner 5 and the mass body 19 are coupled to the driven member 15 that is the output element. However, the damper device 10 is not limited to this. That is, the coupling of at least one of the turbine runner 5 and the mass body 19 to the driven member 15 may be omitted. In the damper device 10 described above, while the input torque to the drive plate 11 is included in the range from the torque T1 to the torque T2, the third spring SP3 may be configured to act in parallel with one of the first and second springs SP1, SP2. Further, the third spring SP3 may be omitted from the damper device 10.

Figure 6:
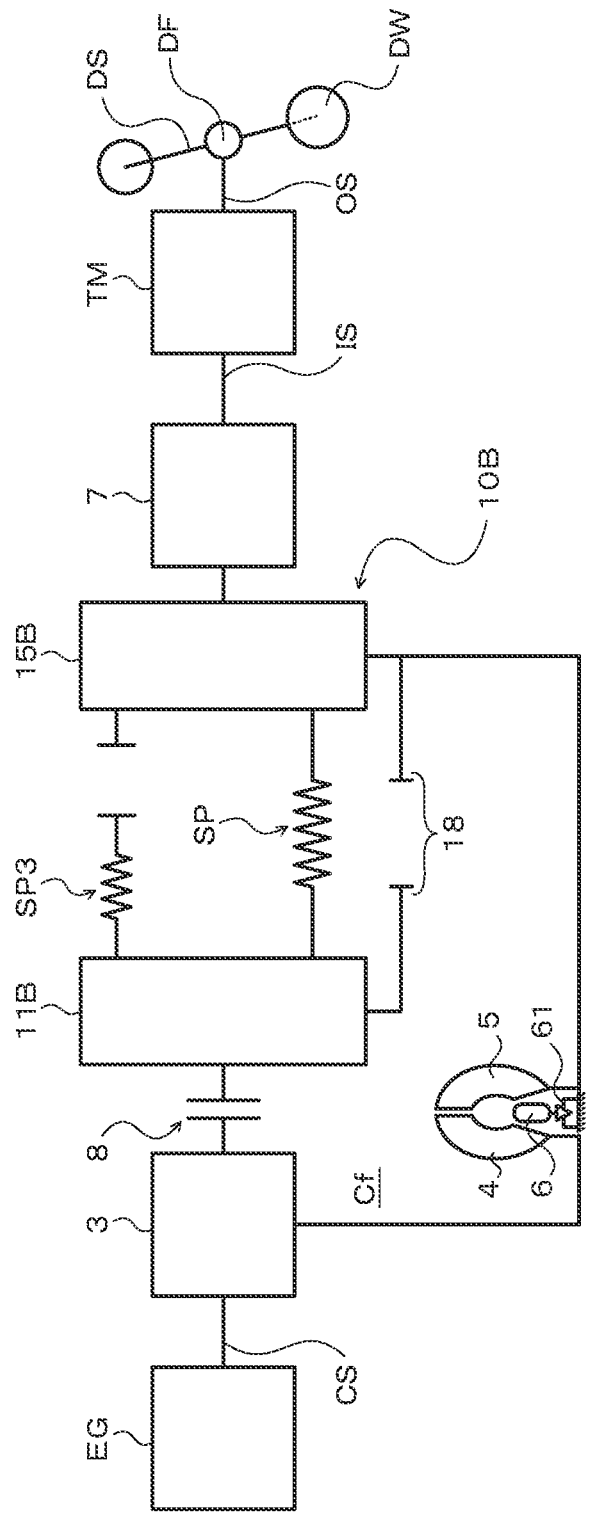
FIG. 6 is a schematic configuration diagram showing another damper device of the present disclosure.

Further, the configuration of the present disclosure may be applied to a damper device 10B that includes a drive member (input element) 11B and a driven member (output element) 15B as rotation elements, that also includes a plurality of springs (elastic bodies) SP (and a plurality of third springs SP3), which is disposed between the drive member 11B and the driven member 15B, as a torque transmitting element, and that does not include an intermediate element (see FIG. 6). In the damper device 10B, a combined spring constant of the plurality of springs SP disposed between the drive member 11B and the driven member 15B is a value in the range of 1400 Nm/rad to 1800 Nm/rad. For example, it is possible to increase the moment of inertia $J_2$ of the damper device 10B by approximately 7 to 8% more than the moment of inertia $J_2$ of the damper device 10, when the frequency of the resonance of the mode in which the output element (and the member that rotates integrally thereof) and all the rotation members between the input shaft of the transmission to the drive shaft is the same for the damper device 10B and the damper device 10 including the intermediate element. Also in the damper device 10B, it is possible to set the lower limit of ratio $J_2/(J_2+J_{TM})$ to 0.12, similar to the damper device 10 described above. That is, when the damper device 10B is designed, it is preferable that the value of the moment of inertia $J_2$ is set so that the ratio $J_2/(J_2+J_{TM})$ satisfies $0.12 \leq J_2/(J_2+J_{TM}) \leq 0.55$.

Thus, in the damper device 10B, it is possible to decrease the lockup rotation speed Nlup while suppressing the vibration damping performance in the low rotation region near the lockup rotation speed Nlup from decreasing, and while suppressing the increase in cost due to an addition of an intermediate member and a spring body. Also in the damper device 10B, when the moment of inertia $J_2$, $J_{TM}$ satisfy $0.15 \leq J_2/(J_2+J_{TM}) \leq 0.3$, or more preferably, $0.19 \leq J_2/(J_2+J_{TM}) \leq 0.23$, it is determined that it is possible to achieve a good balance of suppressing the vibration damping performance in the low rotation region from decreasing and ensuring the decrease amount of the lockup rotation speed Nlup.

Further, the configuration of the present disclosure may be applied to the damper device that includes as the rotation element, the input element, the first intermediate element, the second intermediate member, and the output element, and that includes as the torque transmitting element, the first elastic body disposed between the input element and the first intermediate element, the second elastic body disposed between the first intermediate element and the second intermediate element, and the third elastic body disposed between the second intermediate element and the output element. The configuration of the present disclosure may be applied to a damper device including two torque transmission paths that are provided in parallel, between the input element and the output element. In addition, the input element of the damper device 10 may include at least one drive plate 11, and for example, may include another member that is coupled to the drive plate 11 such as a second plate member and a clutch drum of a hydraulic multi-plate clutch.

A damper device of the present disclosure is a damper device (10) including: an input element (11) coupled to an engine (EG) via a clutch (8); an intermediate element (12); an output element (15) coupled to an input shaft (IS) of a transmission (TM); a first elastic body (SP1) that is disposed between the input element (11) and the intermediate element (12); and a second elastic body (SP2) that is disposed between the intermediate element (12) and the output element (15) and that acts in series with the first elastic body (SP1), in which when a total moment of inertia of the output element (15) and a rotation element (5, 7, 19, 19B, 70) that rotates integrally with the output element (15) on the engine (EG) side with respect to the input shaft (IS) is $J_2$, and a total moment of inertia of all rotation members included between the input shaft (IS) and a differential gear (DF) coupled to an output shaft (OS) of the transmission (TM) is $J_{TM}$, $0.12 \leq J_2/(J_2+J_{TM}) \leq 0.5$ is satisfied.

The present inventors conducted intensive research in order to further improve the vibration damping performance of the damper device including the input element, the intermediate element, the output element, and the first and second elastic bodies. As a result, the inventors focused on the relationship between the total moment of inertia $J_2$ of the output element of the damper device and the rotation element that rotates integrally with the output element on the engine side with respect to the input shaft of the transmission, and the total moment of inertia $J_{TM}$ of all the rotation members included between the input shaft of the transmission and the differential gear. The present inventors found that by configuring the damper device so that the ratio $J_2/(J_2+J_{TM})$ of the moment of inertia $J_2$ with respect to the sum $(J_2+J_{TM})$ of the moment of inertia $J_2$ and the moment of inertia $J_{TM}$ satisfies $0.12 \leq J_2/(J_2+J_{TM}) \leq 0.5$, it is possible to shift the resonance on the lower frequency side of the engagement rotation speed to the much lower frequency side, while suppressing a decrease in the vibration damping performance of the damper device due to the resonance on the higher frequency side of the engagement rotation speed of the clutch. In this way, in the damper device of the present disclosure, it is possible to decrease the engagement rotation speed of the clutch that couples the engine and the damper device, while suppressing an increase in cost due to an addition of a second intermediate element and an elastic body, and while suppressing a decrease in the vibration damping performance in the low rotation region.

Further, the damper device (10) of the present disclosure may satisfy $0.15 \leq J_2/(J_2+J_{TM}) \leq 0.3$, or may satisfy $0.19 \leq J_2/$ $(J_2+J_{TM}) \le 0.23$. As a result, it is possible to achieve a good balance between suppressing a decrease in the vibration damping performance in the low rotation region and ensuring a decrease in the engagement rotation speed of the clutch.

Further, the rotation element that rotates integrally with the output element (15) may include a hub (7) that is coupled to the output element (15) and that is fixed to the input shaft (IS) of the transmission (TM), and a mass body (19, 19B) that is coupled to the output element (15).

Further, the damper device (10) may be disposed in a fluid chamber (Cf) of a starting device (1) including a pump impeller (4) and a turbine runner (5), and the rotation element that rotates integrally with the output element (15) may include the turbine runner (5) coupled to the output element (15).

The input element may include one input plate (11), and the output element (15) may include two output plates (16, 17) that face each other along an axial direction of the damper device (10) and that are coupled to each other so as to sandwich the input plate (11). As a result, the moment of inertia of the output element and also the moment of inertia $J_2$ described above can be made larger.

Further, in the damper device (10), the intermediate element (12) may be disposed between the two output plates (16, 17) in the axial direction.

The damper device (10) may further include a third elastic body (SP3) that is held at least by the output element (15) when torque is not transmitted between the input element (11) and the output element (15), and that acts in parallel with at least either one of the first and second elastic bodies (SP1, SP2) as a relative torsion angle of the input element (11) and the output element (15) increases when torque is transmitted between the input element (11) and the output element (15).

Further, a combined spring constant of the first and second elastic bodies (SP1, SP2) may be 600 to 1000 Nm/rad.

In the designing method of the damper device of the present disclosure, the damper device (10) includes: an input element (11) coupled to an engine (EG) via a clutch (8); an intermediate element (12); an output element (15) coupled to an input shaft (IS) of a transmission (TM); a first elastic body (SP1) that is disposed between the input element (11) and the intermediate element (12); and a second elastic body (SP2) that is disposed between the intermediate element (12) and the output element (15) and that acts in series with the first elastic body (SP1), and when a total moment of inertia of the output element (15) and a rotation element (5, 7, 19, 19B, 70) that rotates integrally with the output element (15) on the engine (EG) side with respect to the input shaft (IS) is $J_2$, and a total moment of inertia of all rotation members included between the input shaft (IS) and a differential gear (DF) coupled to an output shaft (OS) of the transmission (TM) is $J_{TM}$, the moment of inertia $J_2$ is set so that $0.12 \le J_2/(J_2+J_{TM}) \le 0.5$ is satisfied.

Another damper device of the present disclosure is a damper device (10B) including: an input element (11B) coupled to an engine (EG) via a clutch (8); an output element (15B) coupled to an input shaft (IS) of a transmission (TM); and a plurality of elastic bodies (SP) disposed between the input element (11B) and the output element (15B), in which when a total moment of inertia of the output element (15B) and a rotation element that rotates integrally with the output element (15B) on the engine (EG) side with respect to the input shaft (IS) is $J_2$, and a total moment of inertia of all rotation members included between the input shaft (IS) and a differential gear (DF) coupled to an output shaft (OS) of the transmission (TM) is $J_{TM}$, $0.12 \le J_2/(J_2+J_{TM}) \le 0.55$ is satisfied.

The present inventors have conducted intensive studies to improve the vibration damping performance of a damper device including an input element, an output element, and a plurality of elastic bodies disposed between the input element and the output element, and as a result have found that by configuring the damper device so that the ratio $J_2/(J_2+J_{TM})$ of the moment of inertia $J_2$ with respect to the sum $(J_2+J_{TM})$ of the moment of inertia $J_2$ and the moment of inertia $J_{TM}$ satisfies $0.12 \le J_2/(J_2+J_{TM}) \le 0.55$, it is possible to shift the resonance on the lower frequency side of the engagement rotation speed to the much lower frequency side, while suppressing a decrease in the vibration damping performance of the damper device due to the resonance on the higher frequency side of the engagement rotation speed of the clutch. In this way, in other damper devices of the present disclosure, it is possible to decrease the engagement rotation speed of the clutch that couples the engine and the damper device, while suppressing an increase in cost due to an addition of an intermediate element and an elastic body, and while suppressing a decrease in the vibration damping performance in the low rotation region.

Further, another damper device (10) of the present disclosure may satisfy $0.15 \le J_2/(J_2+J_{TM}) \le 0.3$, or may satisfy $0.19 \le J_2/(J_2+J_{TM}) \le 0.23$.

Further, a combined spring constant of the plurality of elastic bodies (SP) may be 1400 to 1800 Nm/rad.

In the designing method of another damper device of the present disclosure, the damper device (10B) includes: an input element (11B) coupled to an engine (EG) via a clutch (8); an output element (15B) coupled to an input shaft (IS) of a transmission (TM); a plurality of elastic bodies (SP) that is disposed between the input element (11B) and the output element (15B), in which when a total moment of inertia of the output element (15B) and a rotation element that rotates integrally with the output element (15B) on the engine (EG) side with respect to the input shaft (IS) is $J_2$, and a total moment of inertia of all rotation members included between the input shaft (IS) and a differential gear (DF) coupled to an output shaft (OS) of the transmission (TM) is $J_{TM}$, the moment of inertia $J_2$ is set so that $0.12 \le J_2/(J_2+J_{TM}) \le 0.55$ is satisfied.

Further, it goes without saying that the invention of the present disclosure is not limited to the embodiments described above, and various modifications can be made within the scope of the extension of the present disclosure. Further, the form for carrying out the various aspects described above is merely a specific form of the invention described in the Means for Solving the Problem, and does not limit the elements of the invention described in the Means for Solving the Problem.

INDUSTRIAL APPLICABILITY

The various aspects of the present disclosure can be used in a manufacturing field of a damper device and the like.

The invention claimed is:
1. A transmission system including a damper device comprising:
an input element coupled to an engine via a clutch;
an output element coupled to an input shaft of a transmission; and
a plurality of elastic bodies disposed between the input element and the output element, wherein when a total moment of inertia of the output element and a rotation element that rotates integrally with the output element on the engine side with respect to the input shaft is $J_2$, and when a total moment of inertia of all rotating members included between the input shaft and a differential gear coupled to an output shaft of the transmission is $J_{TM}$, $0.12 \leq J_2/(J_2+J_{TM}) \leq 0.55$ is satisfied.

2. The transmission system including the damper device according to claim 1, wherein $0.15 \leq J_2/(J_2+J_{TM}) \leq 0.3$ is satisfied.

3. The transmission system including the damper device according to claim 1, wherein $0.19 \leq J_2/(J_2+J_{TM}) \leq 0.23$ is satisfied.

4. The transmission system including the damper device according to claim 1, wherein a combined spring constant of the plurality of elastic bodies is 1400 to 1800 Nm/rad.

5. A designing method of a damper device, the method comprising:
providing an input element coupled to an engine via a clutch;
providing an output element coupled to an input shaft of a transmission; and
providing a plurality of elastic bodies disposed between the input element and the output element, wherein
when a total moment of inertia of the output element and a rotation element that rotates integrally with the output element on the engine side with respect to the input shaft is $J_2$, and a total moment of inertia of all rotation members included between the input shaft and a differential gear coupled to an output shaft of the transmission is $J_{TM}$, setting the moment of inertia $J_2$ so that $0.12 \leq J_2/(J_2+J_{TM}) \leq 0.55$ is satisfied.

6. A transmission system including a damper device comprising:
an input element coupled to an engine via a clutch;
an intermediate element;
an output element coupled to an input shaft of a transmission;
a first elastic body that is disposed between the input element and the intermediate element; and
a second elastic body that is disposed between the intermediate element and the output element and that acts in series with the first elastic body, wherein
when a total moment of inertia of the output element and a rotation element that rotates integrally with the output element on the engine side with respect to the input shaft is J2, and a total moment of inertia of all rotation members included between the input shaft and a differential gear coupled to an output shaft of the transmission is $J_{TM}$, $0.12 \leq J_2/(J_2+J_{TM}) \leq 0.5$ is satisfied.

7. The transmission system including the damper device according to claim 6, wherein $0.15 \leq J_2/(J_2+J_{TM}) \leq 0.3$ is satisfied.

8. The transmission system including the damper device according to claim 7, wherein the rotation element that rotates integrally with the output element includes a hub that is coupled to the output element and that is fixed to the input shaft of the transmission, and a mass body that is coupled to the output element.

9. The transmission system including the damper device according to claim 8, wherein
the damper device is disposed in a fluid chamber of a starting device including a pump impeller and a turbine runner, and
the rotation element that rotates integrally with the output element includes the turbine runner coupled to the output element.

10. The transmission system including the damper device according to claim 9, wherein
the input element includes one input plate, and
the output element includes two output plates that face each other along an axial direction of the damper device and that are coupled to each other so as to sandwich the input plate.

11. The transmission system including the damper device according to claim 10, wherein the intermediate element is disposed between the two output plates in the axial direction.

12. The transmission system including the damper device according to claim 11, wherein the damper device further includes a third elastic body that is held at least by the output element when torque is not transmitted between the input element and the output element, and that acts in parallel with at least either one of the first and second elastic bodies as a relative torsion angle of the input element and the output element increases when torque is transmitted between the input element and the output element.

13. The transmission system including the damper device according to claim 12, wherein a combined spring constant of the first and second elastic bodies is 600 to 1000 Nm/rad.

14. The transmission system including the damper device according to claim 6, wherein $0.19 \leq J_2/(J_2+J_{TM}) \leq 0.23$ is satisfied.

15. The transmission system including the damper device according to claim 6, wherein the rotation element that rotates integrally with the output element includes a hub that is coupled to the output element and that is fixed to the input shaft of the transmission, and a mass body that is coupled to the output element.

16. The transmission system including the damper device according to claim 6, wherein
the input element includes one input plate, and
the output element includes two output plates that face each other along an axial direction of the damper device and that are coupled to each other so as to sandwich the input plate.

17. The transmission system including the damper device according to claim 6, wherein the damper device further includes a third elastic body that is held at least by the output element when torque is not transmitted between the input element and the output element, and that acts in parallel with at least either one of the first and second elastic bodies as a relative torsion angle of the input element and the output element increases when torque is transmitted between the input element and the output element.

18. The transmission system including the damper device according to claim 6, wherein a combined spring constant of the first and second elastic bodies is 600 to 1000 Nm/rad.

19. A designing method of a damper device, the method comprising:
providing an input element coupled to an engine via a clutch;
providing an intermediate element;
providing an output element coupled to an input shaft of a transmission;
providing a first elastic body that is disposed between the input element and the intermediate element;
providing a second elastic body that is disposed between the intermediate element and the output element and that acts in series with the first elastic body, wherein
when a total moment of inertia of the output element and a rotation element that rotates integrally with the output element on the engine side with respect to the input shaft is $J_2$, and a total moment of inertia of all rotation members included between the input shaft and a differential gear coupled to an output shaft of the transmission is $J_{TM}$, setting the moment of inertia $J_2$ so that $0.12 \leq J_2/(J_2+J_{TM}) \leq 0.5$ is satisfied.

* * * * *